US011383182B2

(12) United States Patent
L'Hostis et al.

(10) Patent No.: US 11,383,182 B2
(45) Date of Patent: Jul. 12, 2022

(54) LINEAR SILICONE POLYETHER FOAM CONTROL AGENT

(71) Applicants: Dow Silicones Corporation, Midland, MI (US); Dow Global Technologies Inc., Midland, MI (US)

(72) Inventors: Jacqueline L'Hostis, Seneffe (BE); Xiao Meng, Seneffe (BE); Oguz Türünç, Terneuzen (NL); Hatice Turgut, Seneffe (BE)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/601,208

(22) PCT Filed: Apr. 6, 2020

(86) PCT No.: PCT/US2020/026809
§ 371 (c)(1),
(2) Date: Oct. 4, 2021

(87) PCT Pub. No.: WO2020/263379
PCT Pub. Date: Dec. 30, 2020

(65) Prior Publication Data
US 2022/0143530 A1 May 12, 2022

Related U.S. Application Data

(60) Provisional application No. 62/865,560, filed on Jun. 24, 2019.

(51) Int. Cl.
| C11D 1/82 | (2006.01) |
| B01D 19/04 | (2006.01) |
| C08L 83/12 | (2006.01) |
| C11D 11/00 | (2006.01) |
| C11D 3/37 | (2006.01) |
| C11D 3/00 | (2006.01) |

(52) U.S. Cl.
CPC .......... B01D 19/0409 (2013.01); C08L 83/12 (2013.01); C11D 3/0026 (2013.01); C11D 3/3738 (2013.01); C11D 11/0017 (2013.01)

(58) Field of Classification Search
CPC .......... C11D 1/82; C11D 3/001; C11D 3/0026; C11D 3/162; C11D 3/3738; C11D 9/36; C11D 11/0017
See application file for complete search history.

(56) References Cited

U.S. PATENT DOCUMENTS

| 3,455,839 A | 7/1969 | Rauner |
| 3,784,479 A | 1/1974 | Keil |
| 3,933,672 A | 1/1976 | Bartolotta et al. |
| 3,957,842 A | 5/1976 | Prokai et al. |
| 3,984,347 A | 10/1976 | Keil |
| 4,145,308 A | 3/1979 | Simoneau et al. |
| 4,150,048 A | 4/1979 | Schilling, Jr. et al. |
| 4,562,223 A | 12/1985 | Steinberger et al. |
| 4,983,316 A | 1/1991 | Starch |
| 5,082,590 A | 1/1992 | Araud |
| 5,472,686 A | 12/1995 | Tsubaki et al. |
| 5,767,219 A | 6/1998 | Takarada et al. |
| 5,869,727 A | 2/1999 | Crane et al. |
| 5,965,115 A | 10/1999 | Bolich, Jr. et al. |
| 5,968,872 A | 10/1999 | Policello et al. |
| 6,372,830 B1 | 4/2002 | Sato et al. |
| 6,512,015 B1 | 1/2003 | Elms et al. |
| 6,521,586 B1 | 2/2003 | Hoogland et al. |
| 6,686,327 B1 | 2/2004 | Schmid et al. |
| 7,294,653 B2 | 11/2007 | Zeng |
| 8,492,325 B2 | 6/2013 | Sadlowski et al. |
| 8,734,767 B2 | 5/2014 | Johnson et al. |
| 9,120,997 B2 | 9/2015 | Sadlowski et al. |
| 9,133,421 B2 | 9/2015 | Panandiker et al. |
| 9,610,239 B2 | 4/2017 | Feng et al. |
| 9,777,121 B2 | 10/2017 | Sakurai |
| 10,005,110 B2 | 6/2018 | Delbrassinne et al. |
| 2001/0043912 A1* | 11/2001 | Michael ................ A61K 8/895 424/70.12 |
| 2013/0209921 A1* | 8/2013 | Qiu ........................ G03F 7/0757 430/5 |
| 2014/0127140 A1 | 5/2014 | Ferritto et al. |
| 2017/0204266 A1 | 6/2017 | Kennedy et al. |
| 2017/0218312 A1 | 8/2017 | Panandiker et al. |
| 2017/0233681 A1 | 8/2017 | Hou et al. |
| 2018/0078467 A1 | 3/2018 | Cauvin et al. |

FOREIGN PATENT DOCUMENTS

| JP | 2001201403 | 7/2001 |
| WO | 2005103117 | 11/2005 |
| WO | 20160166979 | 10/2016 |

OTHER PUBLICATIONS

U.S. Appl. No. 62/077,226, filed Mar. 27, 2001, Juen, et al.

* cited by examiner

*Primary Examiner* — Charles I Boyer
(74) *Attorney, Agent, or Firm* — Edward W. Black

(57) ABSTRACT

A foam control agent comprising a linear polyorganosiloxane-polyoxyalkylene block copolymer comprising a single block of polyorganosiloxane having a DP of from 10 to 200 and a single block polyoxyalkylene block having a DP of from 2 to 60.

10 Claims, No Drawings

LINEAR SILICONE POLYETHER FOAM CONTROL AGENT

CROSS REFERENCE TO RELATED APPLICATIONS

This application claims the benefit of U.S. Provisional Patent Application Ser. No. 62/865,560 filed on 24 Jun. 2019 under 35 U.S.C. § 119 (e). U.S. Provisional Patent Application Ser. No. 62/865,560 is hereby incorporated by reference.

FIELD

The invention is directed toward polyorganosiloxane-polyether block copolymers (SPEs) as foam control agents including their use within foam control formulations and cleaning compositions such as liquid detergents and personal care products.

INTRODUCTION

Silicone foam control formulations are well known for use in a wide variety of applications (e.g. pulp and paper, chemical, textile, fermentation and sugar beet processing, water treatment, metal working, etc.) along with use in paints, latexes, cement, fertilizers, soaps and detergents. Such formulations traditionally include multiple constituents, the most of important of which is a silicone "foam control agent." Such agents are sometimes also referred to as antifoams, defoamers, suds suppressors and foam inhibitors. A foam control agent is a material that when added in low concentration, reduces or controls the amount of foaming in an otherwise foaming liquid. Polyorganosiloxanes, and more specifically, polydimethylsiloxanes (PDMS) are one of the most common foam control agents. Silicone foam control formulations also commonly include hydrophobic inorganic fillers (e.g. silica, zeolites, etc.) and emulsifiers that promote the dispersion of the formulation and provide stability when the formulation is provided as an emulsion. See for example U.S. Pat. No. 3,455,839. Such formulations also commonly include solvents or dispersants as performance modifiers including polyorganosiloxane polyether copolymers (SPEs"). See for example U.S. Pat. Nos. 3,784,479, 3,984,347, 4,983,316, 6,372,830, 6,512,015, 7,294,653 and 9,777,121. Several different SPEs structures are described including linear, branched, "raked" and "gemini" type structures. See also JP2001201403 which describes a foam control formulation including an alternating block SPE, silica and an emulsifier for use in dye applications.

Silicone-containing foam control formulations may be incorporated within cleaning compositions used in laundry, cooking and tableware, and personal care applications. See for example: U.S. Pat. Nos. 3,933,672, 6,686,327, 8,492,325, 9,120,997, 9,133,421, U.S. Ser. No. 10/005,110, US2017/0218312 and US 2017/0233681.

Due to industrial hygiene and environmental concerns, there is an increasing interest in developing new foam control formulations with reduced quantities of inorganic fillers and/or cyclic siloxanes. There is also an interest in further reducing costs and complexity of foam control formulations by reducing or eliminating the inclusion of siloxane resins ("MQ" resins). Unfortunately, the reduction or removal of these constituents negatively impacts foam control performance.

SUMMARY

The invention includes a foam control agent comprising a linear polyorganosiloxane-polyoxyalkylene block copolymer comprising a single block of polyorganosiloxane having a DP of from 10 to 200 and a single block polyoxyalkylene block having a DP of from 2 to 60. The copolymer may be represented by Formula I:

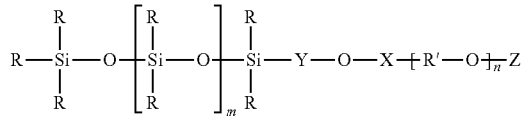

wherein R is the same or different and is independently selected from a monovalent hydrocarbon or alkoxy group having from 1-30 carbon atoms; R' is the same or different and independently selected from a divalent hydrocarbon group having from 2 to 6 carbon atoms; Y is selected from a divalent hydrocarbon group having from 2 to 6 carbon atoms or a linking bond (e.g. when polymer is made via a condensation reaction); X is selected from a linking bond or a bivalent hydrocarbon having from 2 to 22 carbon atoms; Z is selected from: hydrogen, R or an acyl group; m is an integer from 10 to 200 and n is an integer from 2 to 60.

In other embodiment, the invention includes a foam control formulation incorporating the above described foam control agent. In yet other embodiments, the invention includes a cleaning composition including the above described foam control agent or formulation including the same. The present foam control agent provides effective foam control without the use of traditional inorganic fillers. In preferred embodiments, the subject foam control formulation is essentially free of inorganic fillers and/or cyclic siloxanes. In yet another embodiment, the subject foam control formulation is essentially free of siloxane resins.

DETAILED DESCRIPTION

The invention includes a foam control agent comprising a linear polyorganosiloxane-polyoxyalkylene block copolymer. As used herein, the term "linear" means that the copolymer has an (AB) structure with less than 5 wt % of the total polymer comprising branched repeating units. In preferred embodiments, the copolymer has a (AB), structure with a single block of polyorganosiloxane having a degree of polymerization ("DP") of from 10 to 200 (preferably 20-100) and a single block polyoxyalkylene block having a DP of from 2 to 60 (preferably 3-40). The subject copolymer may be represented by Formula I as shown above with each variable being defined as follows:

Each instance of R may be the same or different and is independently selected from a monovalent hydrocarbon group and alkoxy group having from 1 to 30 (more preferably 1 to 20 and even more preferably from 1 to 8) carbon atoms. By way of clarification, each R may be the same or different from each within the copolymer but each R is a monovalent hydrocarbon. Preferred groups of hydrocarbons include: alkyl, aryl and aralkyl with representative species including methyl, ethyl, propyl, butyl, pentyl, hexyl, heptyl, octyl, undecyl, octadecyl, cyclohexyl, phenyl, tolyl, xylyl, benzyl and 2-phenylethyl. The hydrocarbon may group may be unsubstituted or substituted. The hydrocarbon group preferably includes no aliphatic unsaturation. Preferred groups include methyl (Me), ethyl (Et) and phenyl (Ph). In a preferred set of embodiments, at least 50%, 75% or 99% of the R groups are Me. When R is an alkoxy, representative alkoxy groups include methoxy, ethyoxy, propoxy and phenoxy.

Each R' is the same or different and is independently selected (i.e. each instance of R' may be the same or different with the copolymer) from a divalent hydrocarbon group (e.g. alkylene) having from 2 to 6 carbon atoms which may be unsubstituted or substituted (e.g. with a hydroxyl or carboxylic acid functional group). Preferred species include ethylene, propylene and butylene.

Y is selected from a divalent hydrocarbon (e.g. alkylene) group having from 2 to 6 carbon atoms which may be unsubstituted or substituted (e.g. alkyl, alkoxy, hydroxyl, alkyl-hydroxy (e.g. —CH$_2$OH), and carboxylic acid) with representative groups including ethylene, propylene and butylene. Alternatively, Y may be a linking bond (e.g. when polymer is made via a condensation reaction)

X is selected from a linking bond or a bivalent hydrocarbon having from 2 to 22 carbon atoms (e.g. alkylene) which may be substituted with unsubstituted or substituted (e.g. alkyl, alkoxy, hydroxyl, alkyl-hydroxy (e.g. —CH$_2$OH), etc.).

Z is selected from: hydrogen, R (preferably including 1 to 8 carbon atoms) and an acyl group (e.g. a ketone or ester group).

"m" is an integer from 10 to 200 (preferably from 20 to 100) and "n" is an integer from 2 to 60 (preferably from 3 to 40).

The subject block copolymers preferably have a weight average molecular weight (Mw) of from 600 to 20,000 Daltons and preferably comprise from 15 to 85% by weight of the polyorganosiloxane block. The copolymer preferably has a dynamic viscosity (as measured by a Brookfield Cone & Plate at 25° C.) of 50 to 10,000 cP.

The SPE block copolymers of the present invention may be made using conventional methodologies using commercially available reactants (polyorganosiloxanes and polyethers). One classic approach is via a hydrosilylation reaction of an unsaturated terminal group (e.g. alkynyl, alkenyl or "vinyl" functional group) of a polyether with a hydride (—SiH) terminated group of a polyorganosiloxane. An overview of the reaction is described in U.S. Pat. No. 5,869,727. A representative reaction pathway is illustrated below.

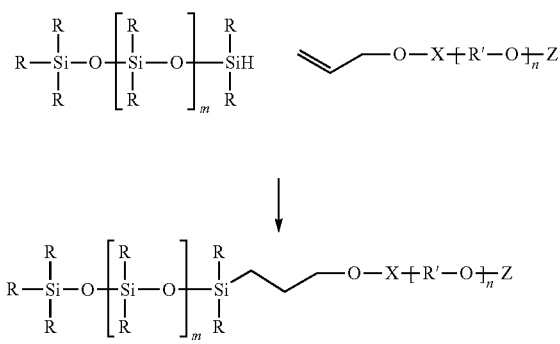

Applicable polyorganosiloxanes for use in preparation of the subject block copolymers are linear and are represented by Formulae II and III, respectively. When utilizing the polyorganosiloxane of Formula III, one of the terminal —SiH groups is "end-caped" using a reactant including a Y' group as defined below resulting in the formation of an R group as previously defined.

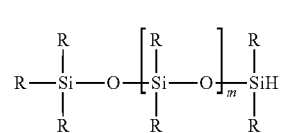

Formula II

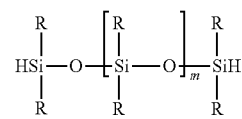

Formula III

Applicable polyorganosiloxanes are commercially available (e.g. from Sigma Aldrich) or can made by using are well known techniques. See for example U.S. Pat. No. 5,486,635.

Applicable polyethers for use in preparation of the subject SPE block copolymers and are represented by Formula IV:

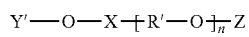

wherein R', X, Z and n are as previously defined and Y' is selected from an unsaturated organic group such as an alkenyl or alkynyl group having from 2 to 6 carbon atoms. Non-limiting examples of alkenyl groups include: H$_2$C=CH—, H$_2$C=C(CH$_3$)CH$_2$— and H$_2$C=CH(CH$_2$)$_a$— where "a" is an integer from 1 to 4. Non-limiting examples of alkynyl groups include: HC≡C—, HC≡CCH$_2$—, HC≡CC(CH$_3$)—, HC≡CC(CH$_3$)$_2$— and HC≡CC(CH$_3$)$_2$CH$_2$—. Preferred R' groups may be the same or different and include: —CH$_2$CH$_2$—, —CH$_2$CH(CH$_3$)—, and —CH$_2$CH$_2$CH$_2$—. Preferred —[R'—O]— repeating unit include ethylene oxide (EO), propylene oxide (PO) and combinations of EO and PO repeating units which may be provided blocks or a random order. X may be a bivalent hydrocarbon having from 2 to 22 carbon atoms. Non-limiting examples include: —CH$_2$CH$_2$—, —CH$_2$CH(CH$_3$)—, —CH$_2$CH$_2$CH$_2$— and —CH$_2$CH(CH$_2$OR")— where R" is selected from hydrogen or alkyl group (preferably having from 1 to 16, and more preferably from 1 to 14 carbon atoms). In another embodiment, X is a linking bond as represented in Formula V:

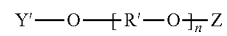

where Z is preferably hydrogen or alkyl group (preferably having from 1 to 8 carbon atoms).

The polyethers used to form the subject block copolymer are linear and preferably include a single unsaturated group located at terminal position (Y'). Commercial examples of such materials include: AM 250 or AM450 available from Clariant Corporation, Reasop SR-10 available from Adeka, and PKA 7317 available from NOF Corporation.

The molar ratio of unsaturated organic groups (e.g. "vinyl") of the polyether to the hydride functional group of the polyorganosiloxane (vinyl:SiH) may be 1:1 and when utilizing a polyorganosiloxane reactant represented by Formula III, is preferably less than 1:1 and more preferably less than 0.75:1.

The hydrosilylation reaction is preferably conducted in the presence of a catalyst. Suitable catalysts include Group VIII transition metals, i.e. the noble metals. Specific examples include so-called Karstedt's and Speier's catalysts. One preferred class of catalysts include a platinum group metal-containing catalyst. By platinum group it is meant ruthenium, rhodium, palladium, osmium, iridium and platinum and complexes thereof. Non-limiting examples of platinum group metal-containing catalysts useful herein are the platinum complexes prepared as described in: U.S. Pat. Nos. 2,823,218 3,159,601, 3,220,972, 3,296,291, 3,419,593, 3,516,946, 3,715,334, 3,814,730, 392,862, 3,923,705, 3,989,668, 5,036,117 and 5,175,325 each of which is expressly incorporated herein by reference. The platinum-containing catalyst can be platinum metal, platinum metal deposited on a carrier such as silica gel or powdered charcoal, or a compound or complex of a platinum group metal. Typical platinum-containing catalysts include chloroplatinic acid, either in hexahydrate form or anhydrous form, and or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. Pat. No. 6,605,734, which is expressly incorporated herein by reference in one or more non-limiting embodiments. The amount of catalyst used typically depends upon the particular catalyst. The catalyst is typically utilized in an amount sufficient to provide at least 2 parts per million (ppm), typically 4 to 200 ppm of platinum based on total weight percent solids (all non-solvent ingredients), based on one million parts of the copolymer. In various embodiments, the catalyst is present in an amount sufficient to provide 1 to 150 weight ppm of platinum on the same basis. The catalyst may be added as a single species or as a mixture of two or more different species.

Due to the presence of a hydrophobic and hydrophilic block, the subject foam control agents are "self-emulsifying." As a consequence, they can be dispersed and stabilized in a variety of liquids. For example, the foam control agent can be utilized by direct addition to a foaming liquid, e.g. a cleaning composition such as a liquid detergent. Alternatively, the foam control agent may be combined with additional constituents to form a foam control "formulation." Representative constituents include polyorganosiloxanes, e.g. polydimethylsiloxane (PDMS) available under the trade name DOWSIL® 200 Fluid having viscosities from 2 cs to 100 cS and more preferably from 10 cS to 50 cS. When combined with the subject foam control agent (SPE) as part of a foam control formulation, the weight ratio of PDMS to SPE is preferably from 1:3 to 3:1. Other representative constituents include mineral oils, organic solvents and the like. When combined with additional constituents, the combination may be mixed to form an organic liquid mixture. Alternatively, the mixture can be combined with a water dispersible carrier such as silicone glycol or alkyl glycol or mineral oil as described in U.S. Pat. No. 5,908,891. In yet another embodiment the foam control agent may optionally be combined with such constituents along with suitable surface active agent (e.g. fatty acid esters, polyalkylene oxides, etc.) and optional thickening agents and water under shear to form an oil-in-water emulsion. Methods for preparing such emulsions are well known and are described in the literature. See for example U.S. Pat. No. 6,521,586.

Traditionally, foam control formulations have included one or more of: inorganic fillers, cyclic siloxanes and siloxane resins. Common inorganic fillers include finely divided particles of silica. The silica is typically fumed or precipitated. Other inorganic fillers include silicates, zeolites, $Al_2O_3$, $TiO_2$, $ZrO_2$ and combinations thereof. The particles typically have a specific surface area of 50-300 $m^2/g$. Cyclic siloxanes (e.g. D4, D5 and D6) are also commonly present in foam control formulations but are now regulated in many jurisdictions. Siloxane resins are also commonly used in foam control formulations. See for example U.S. Pat. Nos. 4,145,308, 5,082,590 and 6,207,722. Such resins are commonly referred to as "MQ" resins and comprise predominantly mono-functional ($R_3SiO_{1/2}$) and tetra-functional ($SiO_2$) units in relative molar ratios of 0.25-0.75 to 1.

In one set of embodiments, the foam control formulation of the present invention exclude or minimize the traditional inclusion of one or more of: inorganic fillers, cyclic siloxanes and siloxane resins. For example, in one set of embodiments, the subject formulation includes less than 1 wt %, less than 0.5 wt %, less than 0.1 wt % and even 0 wt % of an inorganic filler. Formulations including less than 0.1 wt % of an inorganic filler are characterized herein as being "substantially free" of inorganic filler. In another set of embodiments the subject formulation includes less than 0.5 wt %, less than 0.1 wt %, less than 0.01 wt % and even 0 wt % of cyclic siloxanes. Formulations including less than 0.01 wt % of cyclic siloxane are characterized herein as being "substantially free" of cyclic siloxane. In another set of embodiments the subject formulation includes less than 1 wt %, less than 0.5 wt %, less than 0.1 wt % and even 0 wt % of siloxane resin. Formulations including less than 0.1 wt % of siloxane resin are characterized herein as being "substantially free" of siloxane resin. Various embodiments of the invention are substantially free of one, two or three of the following: inorganic filler, cyclic siloxane and siloxane resin.

The subject foam control agent and formulations thereof may be incorporated into inventive cleaning compositions. Such cleaning compositions may be provided in a variety of forms including but not limited to liquid, gel, paste, bar, granular and powder forms. Such compositions may be used in a variety of cleaning applications including but not limited to laundry, cookware and tableware (including dishware and flatware), hard surfaces along with personal care such as body and hair washing. In a preferred embodiment, the subject cleaning composition is a liquid detergent formulation for cleaning laundry. Representative detergent formulations include at least one surfactant. Representative surfactants are described in McCutcheon's Emulsifiers and Detergents, 1989 Annual, published by M.C. Publishing Co. Applicable surfactants include: non-ionic (e.g. polysaccharides, oxylates, amine oxides, fatty acid amides), amphoteric, zwitterionic, cationic (alkylammonium salts) and anionic (e.g. sulfonates, polyalkoxylated carboxylates) surfactants. Applicable detergent formulations may optionally include one or more of: soaps (i.e. fatty acid carboxylates), carriers, builders, perfumes, structurants, adjuncts, brighteners, enzymes, dyes, hydrotropes, solvents, dispersants, hueing agents and rheology modifiers. In a preferred embodiment, the liquid detergent formulation comprises at least one surfactant and from 0.001 to 4.0 wt. % (and more preferably from 0.01 to 2.0 wt. %) of the subject foam control agent.

Many embodiments of the invention have been described and, in some instances, certain embodiments, selections, ranges, constituents, or other features have been characterized as being "preferred." Such designations of "preferred" features should in no way be interpreted as an essential or critical aspect of the invention. Expressed ranges specifically include designated end points.

EXAMPLES

In order to demonstrate the impact of various SPEs on foaming, several sample cleaning compositions were prepared by mixing various SPE foam control agents into a model cleaning composition (liquid detergent) using a Herscheel mixer. The constituents of cleaning composition are listed below in Table 1. The foam control performance for each example cleaning composition was measured by adding 0.7 g of the cleaning composition (including a SPE foam control agent) to 300 ml of tap water in a graduated cylinder. The cylinder was then rotated for 9 minutes making 30 revolution per minute after which the foam height was measured. A summary of the results is provided in Table 2. The method for preparing each example SPE is provided below.

Example 1: In a 100 ml 3 neck bound bottom flask, 50 g (1 equivalent) of $M^H$-D150-$M^H$ was mixed with 3.47 g of allyl branched alkyl-EO10 supplied by Adeka under the trade name Reasorp ER-10 (1.1 equiv.) The mixture was stirred at room temperature (RT) using a magnetic stirrer with a condenser on top, charged with $N_2$. 1 mL isopropyl alcohol (IPA) was added to the solution followed by stirring at room temperature for approximately 10 minutes. The temperature was ramped up to 85° C. and when a temperature of 80° C. was reached, Pt catalyst was added. The catalyst was taken from a stock solution of chloroplatinic acid in isopropanol and 2 ppm of Pt was added into the flask. The reaction was permitted to run for 3 hours at 85° C. After that, 1.27 g of vinyl triethoxysilane (VTES) (1.5 equivalent) with another 2 ppm of Pt catalyst was then added to endcap remaining —SiH groups. The temperature was maintained at 85° C. for 2 hours after which, excess VTES was removed using a 50 mL round bottom placed in cardice (dry ice) for about 1 hour at a pressure of approximately 3 mbar at 85° C. while stirring at 1200 RPM.

Example 2: In a 100 ml, 3 neck round bottom flask, 50 g (1 equivalent) of $M^H$-D60-$M^H$, was mixed with 18.04 g of allyl-EO5PO21 supplied by NOF under the trade name PKA7317 (1.1 equiv.) The mixture was stirred at RT using a magnetic stirrer with a condenser on top, charged with $N_2$. 1 mL IPA was added to this solution. The content was stirred at RT for approximately 10 minutes. The temperature was increased to 85° C. When the temperature reached 80° C., Pt catalyst was added. The catalyst was taken from a stock solution of chloroplatinic acid in isopropanol and 2 ppm of Pt was added into the flask. The reaction was permitted to run for 3 hours at 85° C. The color was amber clear at the end of three hours. Residual IPA was removed by opening the flask while maintaining stirring at 1200 RPM for 1 hour. The remaining —SiH groups were left unreacted.

Example 3: In a 100 ml, 3 neck round bottom flask, 50 g (1 equivalent) of $M^H$-D60-$M^H$ was mixed with 5.41 g of allyl EO10Me supplied by Clariant under the name AM450 (1.1 equiv.). The reaction was conducted in the same manner as described in Example 2.

Example 4: In a 100 ml, 3 neck round bottom flask, 50 g of $M^H$-D60-$M^{butyl}$ (1 equiv.) was mixed with 2.98 g allyl-EO5 supplied by Clariant under the name AM250, 5.87 g, (1.1 equiv.). The reaction was conducted in the same manner as described in Example 2.

Example 5: In a 100 ml, 3 neck round bottom flask, 50 g (1 equivalent) of $M^H$-D60-$M^H$ was mixed with 18.04 g of allyl EO5PO21 supplied by NOF under the trade name PKA7317 (1.1 equiv.). IPA and catalyst were added under the same reaction conditions as described in Ex. 2. Then 1.42 g of alpha methyl styrene (Aldrich) (1.1 equiv.) with another 2 ppm of Pt are added to endcap the remaining —SiH groups. Temperature was increased to 85° C. for 3 hours, after which excess methyl styrene was removed as described in Ex. 1 with respect to VTES.

Example 6: In a 100 ml, 3 neck round bottom flask, 50 g (1 equivalent) of $M^H$-D80-$M^H$, was mixed with 4.09 g of allyl EO10 supplied by Clariant under the name AM450 (1.1 equiv.). IPA and catalyst were added under the same reaction conditions as described in Example 1. The resulting product was then allowed to cool down and 3.14 g of vinyl triethoxysilane (VTES) (2 equivalent) with another 2 ppm of Pt is then added to endcap the remaining SiH. The temperature was set at 85° C. for 3 hours. Excess VTES was removed as described in Ex. 1.

Example 7: In a 50 ml plastic suitable for use in the Heerschel mixer, 10 g of the fluid of Example 6 was mixed with 10 g of Dow Corning 200 Fluid 20 cSt.

Example 8: In a 100 ml, 3 neck round bottom flask, 50 g (1 equivalent) of $M^H$-D40-$M^H$, was mixed with 8.0 g of allyl EO10Me supplied by Clariant under the name AM450 (1.1 equiv.) IPA and catalyst were added under the same reaction conditions as described in Example 2 and residual IPA was removed in a similar manner.

Example 9: (Comparison with Ex. 8 with the addition of silica) In a 50 ml plastic cup suitable for use in the Heerschel mixer, 19 g of the fluid of Ex. 8 was mixed with 1 g of hydrophobic precipitated silica (Sipernat D10). The obtained mixture is then passed through a rotor stator mixer (Silverson®) to disperse adequately the silica particles in the fluid.

Example 10: (Comparison with Example 8 using A(B) pendant structure) In a 100 ml, 3 neck round bottom flask, 50 g (1 equivalent) of MD38$D^H$ 2M, was mixed with 8.8 g of allyl EO10 supplied by Clariant under the name AM450 (1.1 equiv.) IPA and catalyst were added under the same reaction conditions as described in Example 1. The resulting product was then allowed to cool and 4.65 g of vinyl triethoxysilane (VTES) (1.5 equiv.) and an additional 2 ppm of Pt were then added to endcap the remaining —SiH groups. The temperature was maintained at 85° C. for 3 hours and excess VTES was removed as described in Example 1.

Example 11: (Comparison with Example 2 using ABA structure) In a 100 ml, 3 neck Round Bottom flask, 50 g (1 equivalent) of $M^H$-D60-$M^H$, was mixed with 36.08 g of Allyl EO5PO21 supplied by NOF under the trade name PKA7317 (2.2 equiv.). IPA and catalyst were added under the same reaction conditions as described in Example 2. The color was amber clear at the end of three hours. Residual IPA was removed as described in Example 2.

Example 12: (Comparison with Example 3 using ABA structure) In a 100 ml, 3 neck Round Bottom flask, 50 g (1 equivalent) of $M^H$-D60-$M^H$, was mixed with 10.8 g of Allyl EO10Me supplied by Clariant under the trade name AM450 (2.2 equiv.) IPA and catalyst were added under the same reaction conditions as described in Ex. 2. The color was amber clear at the end of three hours. Residual IPA was removed as described in Ex. 2.

Example 13: (Comparison with Example 3 using $(AB)_2$ A structure) In a 100 ml, 3 neck round bottom flask, 50 g (2 equivalent) of $M^H$-D60-$M^H$ was mixed with 11.48 g of Allyl EO13 allyl supplied by NOF under the trade name Uniox DMUS-5 (3 equiv.). The reaction was conducted in the same manner as described in Example 2.

Example 14: (Comparison with Example 3 using $(AB)_2$ structure). In a 100 ml, 3 neck round bottom flask, a first portion of 25 g (1 equivalent) of $M^H$-D60-$M^H$ was mixed with 7.65 g of Allyl EO13 allyl supplied by NOF under the trade name Uniox DMUS-5 (2 equiv.) The reaction was conducted in the same manner as described in Example 2, followed by the addition of a of 25 g (1 equivalent) of $M^H$-D60-$M^H$ added dropwise while maintaining the reaction temperature at 85° C. The reaction was permitted to run for 3 hours at 85° C. Residual IPA in the same manner as described in Example 2.

TABLE 1

Model Liquid Detergent Formulation

| Constituent: | Wt. % |
|---|---|
| SPE (specified below) | 0.5 |
| Anionic surfactant (Disponil 55) | 26 |
| Anionic surfactant (Marlinat 248/28) | 18 |
| Nonionic surfactant (Dehydol LT7) | 12 |
| Propylene Glycol (Dow Chemical Company) | 30 |
| Treithanolamine (Aldrich) | 5 |
| Water | up to 100 |

TABLE 2

Foaming Test Results

| Example No. | Foam test (cm) |
|---|---|
| Control (No SPE foam control agent) | 24 |
| 1 | 6 |
| 2 | 7.75 |
| 3 | 6.5 |
| 4 | 5 |
| 5 | 7 |
| 6 | 7 |
| 7 | 5 |
| 8 | 12 |
| 9 (Comparison with Ex 8 including silica filler) | 13 |
| 10 (Comparison with Ex 8 using A(B) structure) | 24 |
| 11 (Comparison with Ex 2 using ABA structure) | 24 |
| 12 (Comparison with Ex 3 using ABA structure) | 24 |
| 13 (Comparison with Ex 3 using (AB)2A structure) | 24 |
| 14 (Comparison with Ex 3 using $(AB)_2$ structure) | 15 |

As illustrated by the results summarized in Table 2, SPEs having similar chemical compositions but different structures (i.e. A(B), ABA, (AB)2A, and $(AB)_2$) showed little to no improvement over the Control formulation; whereas various SPEs of the present invention showed reduced foaming. Also surprising, the addition of a silica filler (Ex. 9) resulting in no improvement in foaming over the same SPE without filler (Ex. 8).

The foam control performance of cleaning compositions (liquid detergent) was additionally measured using a front-loading washing machine (Miele W1914). 35 g of liquid detergent containing 0.5% by weight of the designated SPE foam control agent was added to the wash tub of the washing machine along with 15 liters of water at 20° C. and 9 cotton towels. The machine wash was then started, and the level of foam was visually determined throughout the wash and rinse cycles. The results are provided below in Table 3.

TABLE 3

Washing Machine Foam Test

| Example No. | Time (min) | | | | | | | | | | |
|---|---|---|---|---|---|---|---|---|---|---|---|
| | 0 | 5 | 10 | 15 | 20 | 25 | 30 | 35 | 40 | 45 | 50 |
| | Foam height (cm) | | | | | | | | | | |
| 2 | 0 | 17.5 | 32.5 | 40 | 47.5 | 52.5 | 57.5 | 60 | 65 | 82.5 | 82.5 |
| 6 | 0 | 10 | 32.5 | 42.5 | 50 | 55 | 65 | 90 | 100 | 100 | 100 |
| 7 | 0 | 5 | 15 | 25 | 30 | 32.5 | 37.5 | 40 | 45 | 47.5 | 50 |
| PDMS 20cS | 0 | 40 | 65 | 90 | 100 | 100 | 100 | 100 | 100 | 100 | 100 |

As shown by Example 7, the inclusion of PDMS in combination with the subject SPE foam control agent resulted in additional foam control.

The invention claimed is:

1. A cleaning composition comprising:
    a) a foam control agent comprising a linear polyorganosiloxane-polyoxyalkylene block copolymer comprising a single block of polyorganosiloxane having a DP of from 10 to 200 and a single block polyoxyalkylene block having a DP of from 2 to 60; and
    b) a surfactant.

2. The cleaning composition of claim 1 wherein the block copolymer comprises from 15 to 85% by weight of the polyorganosiloxane block.

3. The cleaning composition of claim 1 wherein the block copolymer has a weight average molecular weight (Mw) of from 600 to 20,000 Daltons.

4. The cleaning composition of claim 1 wherein the block copolymer has a viscosity of 50 to 10,000 cSt.

5. The cleaning composition of claim 1 wherein the block copolymer is represented by the following formula:

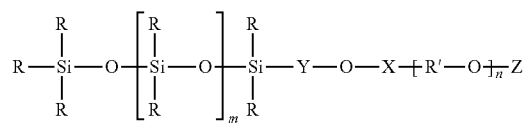

wherein: R is the same or different and is independently selected from a monovalent hydrocarbon or alkoxy group having from 1 to 30 carbon atoms; R' is the same or different and is independently selected from a bivalent hydrocarbon having from 2 to 6 carbon atoms; Y is a divalent hydrocarbon group having from 2 to 6 carbon atoms or a linking bond; X is selected from a bivalent hydrocarbon having from 2 to 22 carbon atoms or a linking bond; Z is selected from: hydrogen, R and an acyl group; m is an integer from 10 to 200; and n is an integer from 2 to 60.

6. The cleaning composition of claim 5 wherein: R is the same or different and is independently selected from: Me, Et or Ph; and Z is selected from: hydrogen and R.

7. The cleaning composition of claim 1, wherein the composition is substantially free of at least one at: cyclic siloxanes, inorganic fillers, and siloxane resins.

8. The cleaning composition of claim 7, wherein the composition is substantially free at cyclic siloxanes, inorganic fillers and siloxane resins.

9. The cleaning composition of claim 7, wherein the composition further comprises polydimethylsiloxane having a viscosity of from 2 cs to 100 cS.

10. The cleaning composition of claim 1 wherein the cleaning composition is a liquid detergent.

\* \* \* \* \*